United States Patent

[11] 3,623,765

| [72] | Inventor | Duane C. Bowen<br>103 Insurance Bldg., 208 N. Market,<br>Wichita, Kans. 67202 |
|---|---|---|
| [21] | Appl. No. | 884,843 |
| [22] | Filed | Dec. 15, 1969 |
| [45] | Patented | Nov. 30, 1971 |

[54] FOLDING TENT CAMPING TRAILER
20 Claims, 15 Drawing Figs.

[52] U.S. Cl. ............................................. 296/23, 135/1
[51] Int. Cl. ............................................. B60p 3/32
[50] Field of Search ................................ 296/23, 23 A, 23 F, 23 G, 23 MC, 26, 27; 135/1 A, 4 A, 5 A

[56] References Cited
UNITED STATES PATENTS

| 1,715,971 | 6/1929 | Wilson ......................... | 296/23.6 |
| 3,065,019 | 11/1962 | May ............................. | 296/23.6 |

FOREIGN PATENTS

| 1,028,739 | 2/1953 | France ......................... | 296/23.6 |

*Primary Examiner*—Philip Goodman

ABSTRACT: An extra double bed in a folding tent camping trailer is suspended under one of the beds cantilevered from the top of the boxlike trailer body. The external paneling supporting the mattress of the extra lower bed is formed at least partly from the paneling of the adjacent trailer wall, which is hinged down. The tent shelter has fabric flaps depending from around the upper bed and forming all or part of the walls of the lower bunk.

INVENTOR.
BY Duane C. Ewen

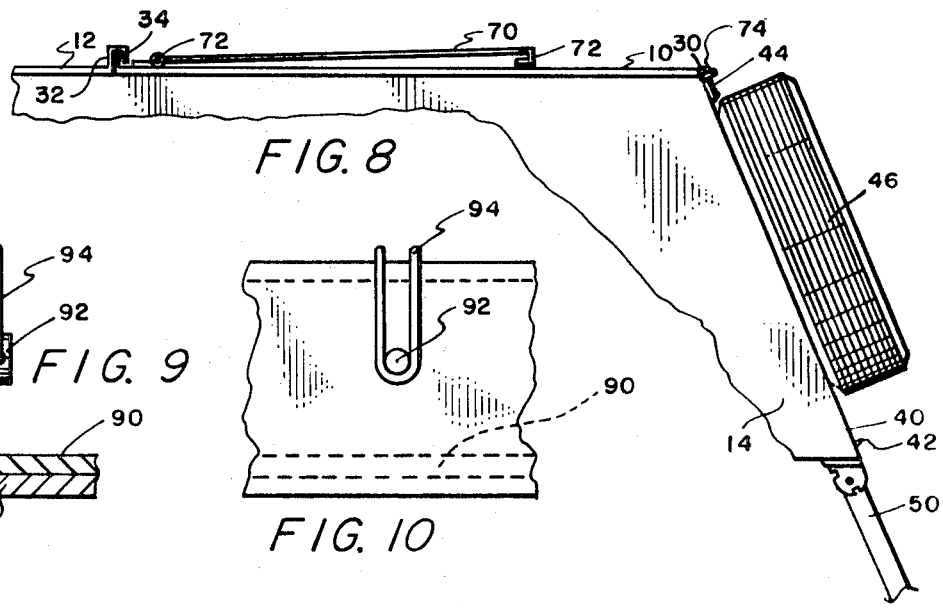

FOLDING TENT CAMPING TRAILER

BRIEF SUMMARY OF THE INVENTION AND OBJECTIVES

My invention relates to providing extra bunking space in a folding tent camping trailer by suspended double bunking. More specifically, a double bed is suspended under one or more of the double beds normally cantilevered from the top of the boxlike trailer body, and preferably the lower bed is formed at least partly from paneling hinged down from the trailer wall.

The folding tent camping trailer meets a need partly common to and partly different from tents, rigid metal trailers, campers on pickup bodies, etc. They are distinguished on matters such as cost, convenience for use, time and ease of erection and disassembly, wind resistance on the road, comfort, and capacity. One common problem particularly true of folding tent trailers is to economically provide enough beds for a family or other sizable party, and sometimes tent trailers are made so large as to overlap the price of smaller rigid metal trailers in order to provide more room for beds or sometimes to provide lesser beds but more space for other purposes. A large number of the camping trailers sleep six in which (a) two persons are accommodated in each of two double beds cantilevered out from the top of the boxlike trailer walls and (b) the fifth and sixth persons are accommodated in a bed made up and substantially filling the boxlike body and oftentimes made at least partly by the trailer seats and the table which is lowered for that purpose. It will be understood it would be desirable economically (a) to provide room to sleep eight for families or parties of eight or (b) to avoid forming a bed inside the boxlike trailer, etc. It is an objective of my invention to provide one or more extra double beds not taking space already occupied in folding tent trailers and particularly by double bunking and more particularly by suspending one or more double beds below double beds cantilevered out from the tops of trailer walls. It is a further objective of my invention to provide associated necessary or desirable features such as providing paneling for the lower bunk support out of trailer wall paneling, providing leg means to support changed trailer and occupant weight distribution, adapting tent fabric parts for the extra bunk, etc. Additional objectives include providing means to meet space, convenience and other objectives at minimum cost and to minimize time of erection and takedown of extra bunking.

My invention will be best understood together with additional objectives and advantages thereof, from the following description, read with reference to the drawings, in which:

FIG. 8 is an enlarged side view of portions of the trailer of FIG. 1 in folded collapsed position.

FIG. 9 is an enlarged fragmentary view, partly in section, taken on line 9—9 of FIG. 11 and FIG. 10 is a side view of the structure shown in FIG. 9.

FIG. 11 is a fragmentary view, partly in section, showing portions of the structure viewed in FIG. 7 on larger scale.

FIG. 12 is an enlarged fragmentary view of part of the hinge structure of FIG. 7.

FIG. 13 is a fragmentary view of a portion of the structure shown in FIG. 1 on larger scale.

FIG. 14 is a view of a portion of the structure shown in FIG. 11 on enlarged scale.

FIG. 15 is a full view of a grommet and turn button canvas fastener.

Figure 1:
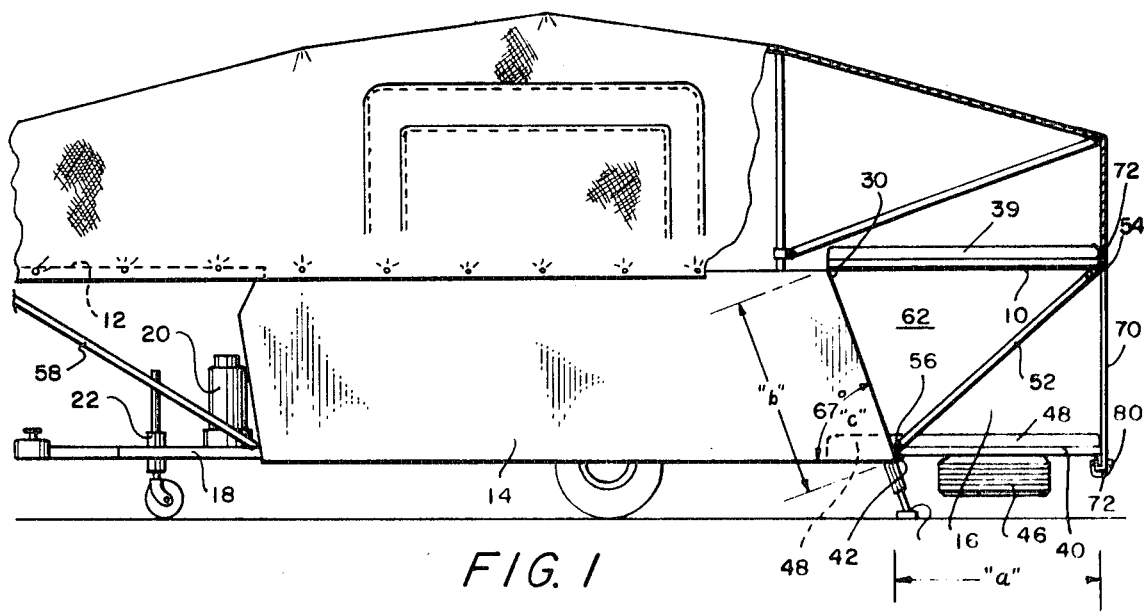
FIG. 1 is a side view, partly in section, of a folding tent camping trailer showing a specific embodiment of my invention.

In the drawings I have shown one of the two basic types of folding tent camping trailers. In this trailer type (a) the upper shelter is all canvas when the trailer is erected (b) the canvas is supported by rods folded and unfolded pivotally from the trailer body and (c) the two double bed panels in outrigger position during use (conventional in such trailers) are hinged from the body on piano hinges and form the trailer top when the trailer is folded down into collapsed transportation configuration. My improvements to folding tent camping trailers, however, are equally applicable to the second basic type of folding tent camping trailers and it will be obvious to those working in the art how to adapt my improvements to the second trailer type. In the second folding tent camping trailers type (a) the trailer has a hard top (usually plastic and usually having an integrated foam insulation) which forms the top of the trailer in collapsed transportation position and which is raised directly upwardly on telescoping or other supports during trailer erection to form the central part of the trailer shelter immediately over the trailer body, (b) the remainder of the shelter top is canvas which unfolds over the outrigger beds when the bed supporting panels are brought out to outrigger position, and (c) the outrigger bed panels move horizontally out (rather than being hinged), being either pulled out or automatically coming out on raising of the trailer top (sometimes the raising of the top being cable driven from a motion input in the form of a rotated crank). One example of the first trailer type with an all canvas top is the "SU-LE Custom Camper," manufactured by SU-LE Manufacturing Company, Inc., 308 W. Mill, Plainville, Kansas. A couple of examples of the plastic top second trailer type are various "PUMA" models manufactured by SKI-TOW Manufacturing Company, Inc., 3301 Phillips Street, Elkhart, Indiana, and "Camel" - "Oasis" model trailers manufactured by Camel Manufacturing Company, 329 South Central Street, Knoxville, Tennessee, which also manufactures all-canvas top trailer models called "Camel" - "Dunes" and "Camel"- "Caravan."

In both types of folding tent camping trailers a pair of double bed panels 10, 12 are cantilevered from the top portion of the boxlike trailer body 14 when the trailer is erected. It appears I was the first (a) to notice the space for a lower double bunk bed below each upper bed panel at about the level of the lower edge of body 14, (b) to realize how easily the trailer construction could be adapted to provide such lower bunk and (c) to comprehend how basic the question of number of beds was to the folding tent camping trailer and how the minimum of six persons could be accommodated in three beds, without putting one in the middle of body 14, by utilizing the space partly defined by the upper bunk and by utilizing the support system partly defined by the upper bunk, as well as the dual purpose of the adjacent trailer wall which could provide the needed "door" to the under bunk by becoming the under bunk panel.

Figure 4:
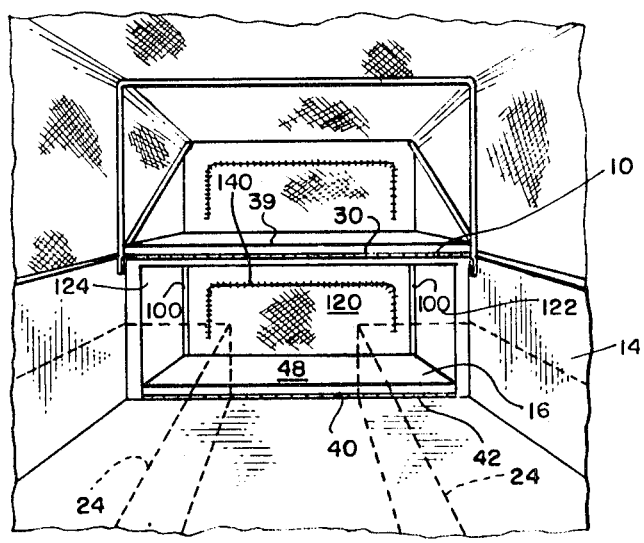
FIGS. 4 and 5 are interior partial perspective views of the structure of FIG. 3.
Figure 5:
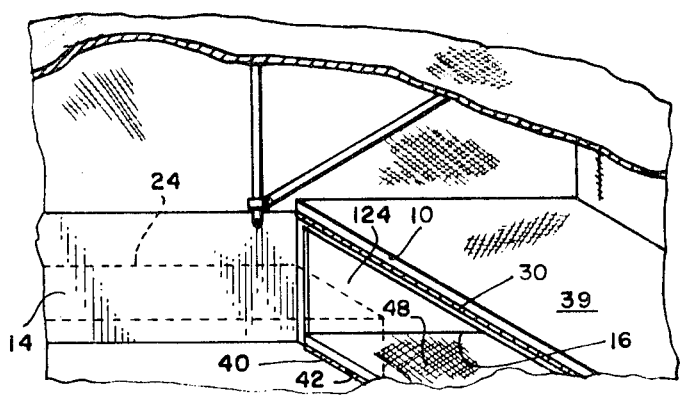

Note that I have shown the underbunk 16 to the rear of body 14. In some trailers the bed panels extend to either side rather than fore and aft and my invention would work extending to the side instead, although it will be understood to be particularly advantageous as shown. I have considered it better to extend to the rear rather than to the front despite the natural support for the lower bunk in down position afforded by trailer tongue 18 because a forward lower bunk would interfere with the conventional usage of supporting a propane bottle 20 on tongue 18 and the crank activated caster assembly 22. Of course, it can be decided to accommodate eight persons with a forward as well as an aft lower bunk (or to accommodate 10 persons by also maintaining a bed central of box 14), etc. although the accommodation of six persons is more basic. Referring to FIG. 4 and 5, it should be understood that commonly benches 24 (storage boxes also accommodating wheel wells) are provided on either side and a table (not shown) is removably erected between benches 24 for eating and other purposes. A double bed is provided at this point commonly by lowering the table coplanar with the tops of seats 24 and by covering the same with a mattress. This is unhandy as most of the floor space within trailer box 14 is occupied by this bed when in use. I propose accommodating six people sleeping without using the table-bench space and by either leaving the table up at night (in which case access to lower bunk 16 is by crawling under the table) or by removing the table for the night providing fine access to lower bunk 16. Usually it will be understandably a preferred structure to have the rear edges of upper and lower bunks on about the same vertical, this may be modified particularly in the structure of FIGS. 1 and 2 wherein the lower bunk rear edge may be forward of the upper bunk rear edge a greater or lesser distance.

The drawings show hinging upper bed panels 10, 12 about piano hinges 30 at the top of box 14. However, as above-indicated, the plastic hard top trailer slides panels 10, 12 out (which do not form the roof of the trailer), and it is not necessary that upper bed panels be hinged. In the form of trailer shown in the drawing, panels 10, 12 become the top of the trailer in the collapsed transportation boxlike envelope condition, as shown in FIG. 8, in which panel 12 is shown as having an inverted channel shape edge 32 receiving flange edge 34 of panel 10 in effecting a seal of the top of the collapsed trailer. Pivoting of panels 10, 12 to form the expanded camping shelterlike envelope condition of the trailer will be readily understood. Upper bunk mattress is indicated at 39, which is of double bed width, albeit a narrow double bed.

Rear wall 40 normally has a fixed upright enclosure sheet paneling. In the specific embodiments of the invention shown, I propose making all or part of the supporting panel for the lower bunk 16 by hinging rear wall 40 downward about piano hinge 42. In FIG. 8 I indicate some type of latch or lock 44 to hold panel 40 up in place during transportation. Wall 40 commonly supports a spare tire 46 and according to my design, tire 46 can remain in place on wall 40 during camping.

Figure 2:
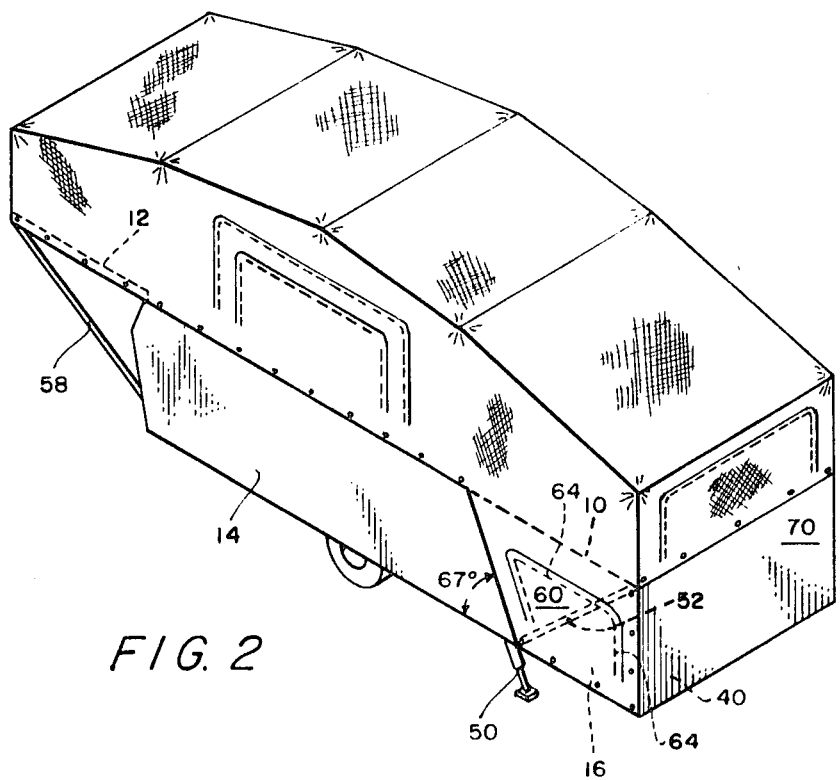
FIG. 2 is a perspective view of the trailer of FIG. 1.

I show two configurations of lower bunk structures and I will first describe the version principally shown in FIGS. 1 and 2. Although the rear walls of trailers are sometimes slanted to the vertical or have two or more planes, the rear walls conventionally are not slanted enough to provide the results shown in FIG. 1 in which the lower bunk support is completed by merely lowering panel 40, and in which it is selected to have the rear edges of both upper and lower bunks on about the same vertical. Considering distance a as being the distance between (approximately) a vertical through the rear edge of the upper bed and hinge 42, observe that this distance necessarily has to be the same distance as b which is the width of the plane of panel 40 in the rear wall of the trailer. The height of the box 14 relative to length and width shown in the drawings is about maximum of those on the market, i.e., the height of box 14 may be taken as 31 inches or 32 inches and the width of panels 10 and 12 may be taken as 48 inches each. With these dimensions, dimension a (distance b being equal thereto in length) will extend to the rear a sufficient distance if the angle c is given the extraordinarily small value of about 67°, and, of course, this angle would have to be further decreased if the height of the box were further decreased relative to box length. The lower bunk 16 actually is formed partly by the floor of box 14. Part of lower double bed mattress 48 rests on the floor of box 14 and part of mattress 48 rests on panel 40. (At least the lower portions of box seats 24 will have to be cutaway or recessed to accommodate mattress 48.) Of course, an advantage of this construction is simplicity, e.g., the support for mattress 48 is provided merely by lowering panel 40. One disadvantage in the configuration shown is extra material involved in slanting the rear wall of the trailer at such a considerable angle with the vertical. A further advantage is the fact that the 67° or so inclination provides a support for rear legs 50 much farther to the rear relative to the upper and lower rear bunks than otherwise would be possible. In the modified form of invention subsequently to be described, I have considered it desirable to provide additional rear leg supports for panels 10 and 40. The question is one of proper support considering the weight of the trailer, the weight of occupants, any inclination of ground, and a "safety factor." If it is estimated, for example, that the trailer weighs 750 lbs. and that four 200 lbs. men were on the upper and lower mattresses supported by panels 10 and 40, it will be understood that little safety factor is provided if rear legs 50 are near the vertical plane of upper piano hinge 30. However, with the configuration shown in FIG. 1, the inclination of rear wall 40 is such that rear legs 50 bear on the ground about one-third mattress width to the rear of a vertical from hinge 30, which means the above weights would be supported with sufficient safety factor against tipping. By word "safety" in the expression "safety factor" I do not mean necessarily that serious physical injury would be caused to occupants if the trailer tipped about legs 50 due to weight of occupants in the rear bunks but I do mean tipping would be, at best, annoying. To the extent the rear edge of panel 40 is permitted to be forward of the rear edge of panel 10 (and mattress 48 extends further forward on the floor of box 14), the magnitude of angle c can be increased, but more floor is occupied.

Legs 50 are conventional off-the-shelf hardware used on trailers on the market and I will not detail them other than to observe they are pivotal from a retracted horizontal position extending forward during transportation to the operative depending position shown during camping, and the lengths of legs 50 are readily adjustable to bear on the ground. All details of structure and operation are common knowledge to those working in the art.

I have shown in FIG. 1 that upper panel 10 is supported in rearly extending position by conventional removable tube braces (used on trailers on the market) detachably pinned at 54 and 56 in the same manner that forward panel 12 is removably supported by braces 58. It is my design choice in FIG. 1 to preserve these diagonal tube braces 52 and to hang the rear edge of panel 40 from panel 10, rather than to take the design choice shown in FIGS. 6 and 7 in which rear legs are used instead of diagonal bracing.

Walls, at each side of the trailer, for lower bunk 16 are formed by extending the normal canvas fabric walls of the trailer at 60 and 62 and securing the fabric by suitable means such as conventional turn buttons and grommets. A screened ventilation opening closed with a flap secured by slide fasteners is indicated at 64 in FIG. 2 which is similar to the other conventional screens and closures shown at other places in the drawings representing constructions commonly found in existing trailers. Note, particularly if access to lower bunk 16 were not provided from the trailer, detail 64 can instead be taken as the outline of a door for access to lower bunk 16 from outside the trailer.

Figure 3:
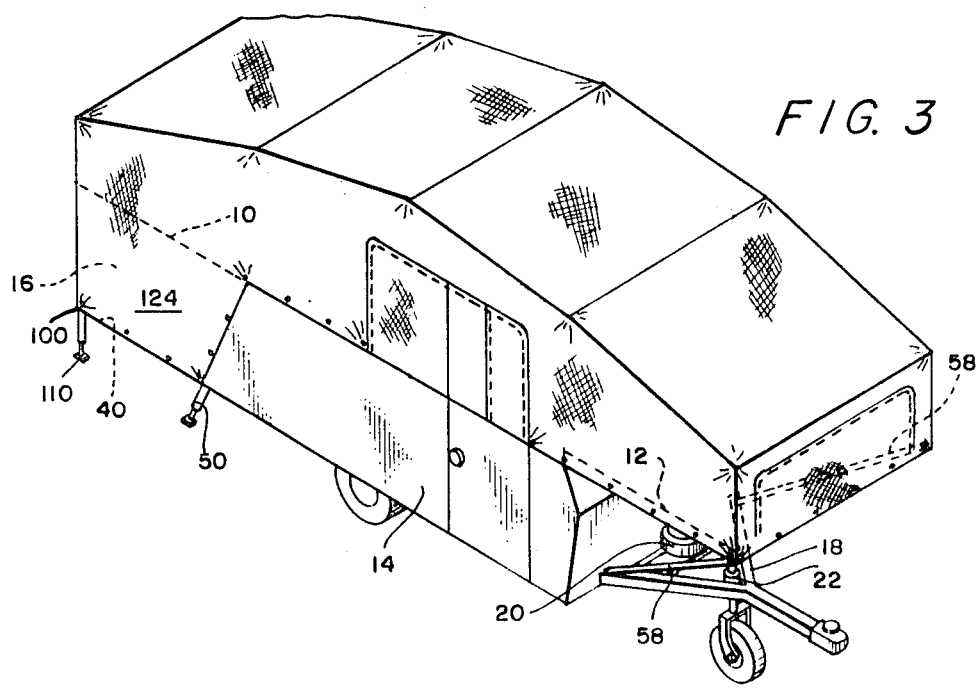
FIG. 3 is a perspective view of a modified form of the invention.

I have provided a rear wall 70 for lower bunk 16 (particularly shown in FIGS. 1, 3 and 8) by hinging a metal sheet 70 to panel 10 by piano hinge 71 to move from the position of FIG. 8 superposed to top panel 10 to a position as in FIGS. 1 and 2 in camping trailer configuration in which panel 70 depends from upper bunk supporting panel 10. I show securing of panel 70 to panel 40 to support the latter simply by providing a return bend channel 72 on panel 70 receiving a flange 74 on panel 40. Securing of flange 74 in channel 72 (in addition to the action of gravity) is by means of the pin 80 (and keeper 82) extending through aligned holes in those parts. Pin 80 and keeper 82 are off-the-shelf articles of hardware previously used for securing other parts in camping folding tent trailers, so I will not detail their structure and operation as they are well known to those working in the art.

FIGS. 3-7 principally illustrate a modified structure in which a primary distinguishing feature is that rear wall panel 40 is supplemented in camping configuration, for extra double bed mattress supporting function, by a telescoping panel 90 slid out in camping configuration and retracted in transportation configuration and secured in extended position by a pin 92 and keeper 94 (of the same type shown in FIG. 13) selectively positioned in openings such as 96. FIGS. 1 and 2 by contrast, do not supplement the width of panel 40 exteriorly of the trailer, but, in effect, do supplement the width of panel 40 by lapping the lower mattress 48 on the floor of trailer box 14, which for that purpose must be cleared of interfering structure.

Panel 90 has a channel shape and panel 40 has flanged edges enclosing the flanges of panel 90, as shown particularly in FIG. 9. It will be understood that in this way a relatively short rear wall 40 can be widened to double bed width with the rear edge of the telescoping extension substantially aligned with a vertical through the rear edge of upper panel 10, as is preferable from a viewpoint of some design considerations.

Figure 6:
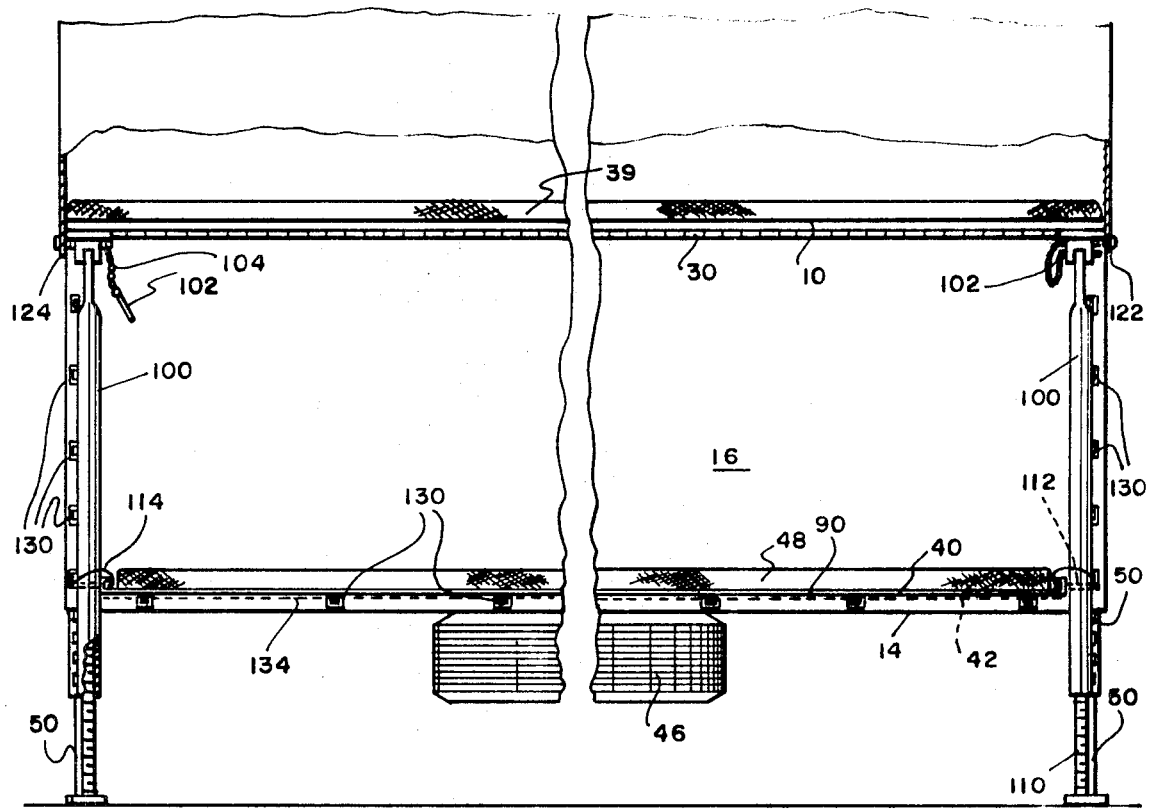
FIGS. 6 and 7 are enlarged, partly sectional views of portions of the structure of FIG. 3, FIG. 6 being an end view and FIG. 7 being a side view.

In this modified structure, the problem of support of panels 10, 40 far enough rearwardly to guard against trailer tipping and the problem of suspension or other support of the rear edge of the lower bunk panel (40, 90) are solved by the use of rear legs 100 removably pinned to upper panel 10 by pins 102. In FIG. 6 I show the pin 102 on the left removed and secured to leg 100 against loss by a wire or chain 104, in the manner that pins for diagonal braces 58, 52 are conventionally made.

The lower end of leg 100 illustrates one form of providing adjustable length by having foot members 110 threaded into tube 100 and advanced or retracted as needed for ground contact and leveling. This, of course, is just one form of adjustable length leg (adjustable partly to unevenness of terrain) and is subject to design refinement. Likewise, the means for securing lower panels 90 to leg 100 is just one form of securing means. This is indicated as consisting of a pin 112 (and wire keeper 114) secured in aligned openings in legs 100 and the flanges of panel 90, as particularly shown in FIGS. 11, 6 and 7. Pin 112 and keeper 114 are like the pins and keepers illustrated in FIGS. 9 and 13.

Figure 7:
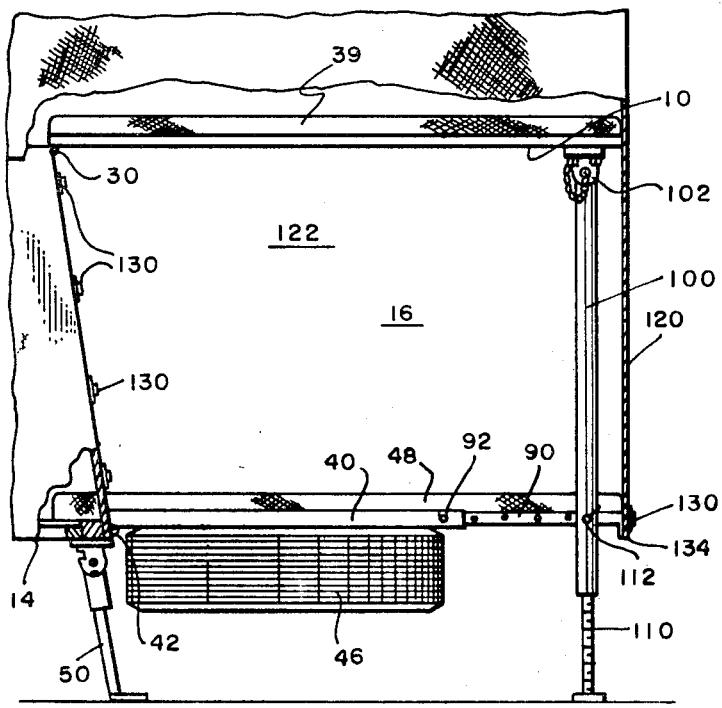

In the structure of FIGS. 6, 7, etc. both rear wall 120 and sidewalls 112, 124 are formed by continuation of the canvas fabric conventionally forming the upper portion of the shelter. The canvas walls 120, 122, 124 are suitably secured by means such as the well-known turn buttons 130 and grommets 132. Some of the turn buttons 130 are on a downturned flange 134 on the rear edge of telescoping panel 90. In the FIGS. 3–7 structure a ventilating screen-flap structure 140 is provided in rear wall 120. The supporting legs 100 are a substitute in FIGS. 3–7 for the diagonal braces 52 of FIGS. 1–2 which are omitted.

It will be understood I have provided a new source for additional room in folding tent camping trailers, or alternatively, I have provided means for relocating a double bed from within the boxlike trailer envelope to outside that envelop (i.e., to provide beds for six people without encumbering the center of the trailer with a bed). I have accomplished this with minimum additional cost. The structure shown will be understood by those working in the art to be most readily adaptable to hard top folding camping trailers with pullout upper bed panels. In fact, my new lower bunk structure (under one or more cantilevered upper bunks) is adaptable to various configurations, although I have illustrated preferred embodiments. I have provided minimum change to fabric parts and ready addition to existing fabric parts, and the same minimum change and ready adaptation is true of metal trailer panels, diagonal braces, rear legs, tongue constructions, etc. Those working in camping tent trailer manufacture will find my structures readily understandable and logical.

Another feature of my construction should be noted. With rear panel 40 hingedly mounted and secured by latch means 44, this means an additional means of access to the interior of the trailer has been provided, during traveling or otherwise, in addition to the usual door shown in FIG. 3. This means, in packing up, panel 40 may not be put up until late so that additional items may be stowed away, or this may be opened up during lunch break for access to supplies (the storage within the trailer may be configured to take advantage of this rear access without full trailer unfolding). Particularly during lunch break, panel 40 can become a needed table (or even a supporting surface of the nature of a seat or reclining surface). This lunch break (during traveling) type usage without full trailer unfolding presumes panel 10 is not unfolded and available or even suitable for support of panel 40, so legs 100 or other support should be available to support the rear portion of panel 40 to maintain panel 40 in horizontal disposition.

One objective in tent trailers is minimum erection time. Perhaps this is overemphasized, i.e., saving of 3 minutes time should not be essential particularly in the environment of leisurely camping but, in any event, the lower bunk structure shown can be erected with extremely little additional time. In fact, the lower bunk could be provided in an automatically lowered or extended panel if it were though necessary to automate erection with a crank and cables, etc., although, again, it is believed minimum erection time can be oversold.

Having thus described my invention, I do not wish to be understood as limiting myself to the exact details of construction shown but instead wish to cover those modifications thereof which will occur to those working in the art upon learning of my disclosure, and which properly fall within the scope of my invention.

I claim:

1. The improvement in a camping trailer to be towed behind a vehicle and having a trailer-type chassis supporting a floor and boxlike side and end walls, said trailer having semiautomatically erectable, integrally articulated, linked and connected parts including movable rigid panels and including fabric shelter portions expandable and collapsible between collapsed transportation boxlike envelope condition with a rigid panel top and no fabric shelter portions exposed, and expanded camping shelterlike envelope condition, said trailer including at least a first integral articulated double bed panel movable as a unit between a first inner position within said collapsed envelope and a second outer position in said expanded envelope extending generally horizontally outwardly from the top portion of one of said walls in cantilevered-like configuration, and said trailer including means raising an integral articulated shelter including said fabric shelter portions over said trailer as it changes from collapsed condition to expanded condition and enclosing said trailer including said first panel, comprising:
   a. a second integral articulated double bed panel;
   means supporting said second panel to move as a unit between a first inner position within said collapsed envelope and a second position in said expanded trailer condition cantilevered horizontally outwardly relative to said one of said walls and spaced vertically from and in superposed relationship with said first panel whereby there is a double bunk relationship providing room for two persons to sleep on said first panel and providing room for two more persons to sleep on said second panel;
   c. said second panel being in the volume enclosed by said means raising a shelter in the expanded condition of said trailer.

2. The subject matter of claim 1 in which said panels extend from said trailer in expanded trailer condition in a direction longitudinal of said trailer.

3. The subject matter of claim 2 in which said panels extend rearwardly from said one of said walls in the expanded trailer condition, and said trailer having leg means contacting the ground rearwardly of a vertical through the front edge of said first panel a distance of at least about one-third of the width of said first panel as a precaution with a safety factor against tipping of said trailer when said double bed panels are loaded by occupants.

4. The subject matter of claim 1 in which in the expanded trailer condition said second panel is below said first panel at a level near the bottom of said one of said walls whereby the spacing of said panels is comparable to the height of said one of said walls.

5. The subject matter of claim 4 in which said second panel has its edge hinged to said one of said walls and at least part of said second panel forming paneling of said one of said walls in the trailer collapsed condition.

6. The subject matter of claim 5 in which in trailer expanded condition said panels extend rearwardly from said one of said walls which is the trailer rear wall.

7. The subject matter of claim 6 in which there is a third panel hinged to said first panel and depending from the rear lower surface thereof in expanded trailer condition and securing means securing the lower edge of said third panel to the rear edge of said second panel whereby said third panel holds said second panel up and forms a rear wall of the lower bunk formed by said second panel.

8. The subject matter of claim 5 in which a part of said second panel has a second sheet besides the part forming paneling of said one of said walls and said second sheet is telescopically mounted relative to said paneling whereby in the expanded trailer condition said second panel is widened from about the width of said one of said walls to double bed width by means of extension of said second sheet, and securing means operable to secure said paneling and said sheet in expanded condition.

9. The subject matter of claim 4 in which there is a pair of bracing rods temporarily secured to the outer portion of said first panel and to the lower portion of said trailer acting to hold said first panel in generally horizontal position in said expanded trailer condition, and said second panel being shorter than said first panel and fitting between said rods.

10. The subject matter of claim 9 in which the outer edge of said second panel is suspended from said first panel and said panels extend rearwardly from said trailer.

11. The subject matter of claim 4 in which in said expanded trailer condition there is access to the space between said first and second panels which forms a bunk through said one of said walls from the space inside said boxlike walls.

12. The subject matter of claim 4 in which said one of said walls is tipped inwardly of the boxlike envelope as it extends upwardly and said second panel has its inner edge hinged to said one of said walls and said second panel being formed completely by paneling of said one of said walls, and said one of said walls being tipped at great enough angle relative to the vertical so that when said second panel is hinged outwardly and downwardly under said first panel the outer edge of said second panel is adjacent to a vertical through the outer edge of said first panel.

13. The improvement in a camping trailer to be towed behind a vehicle and having a trailer-type chassis supporting a floor and boxlike side and end walls, said trailer having movable rigid members and fabric shelter portions expandable and collapsible between collapsed transportation boxlike envelope condition and expanded camping shelterlike envelope condition, said trailer including at least a first double bed panel movable as a unit between a first inner position within said collapsed envelope and a second outer position in said expanded envelope extending generally horizontally outwardly from the top portion of one said walls in cantilevered-like configuration, comprising:
  a. a second double bed panel which is of generally flat sheetlike construction;
  b. means suspending said second panel directly below said first panel in said expanded camping shelterlike envelope condition above ground level in double bunk relationship to said first panel and a sufficient distance below said first panel to accept occupants on said second double bed panel, said second panel extending horizontally outwardly relative to said one of said wall,
  c. said second panel and said means suspending the same being operable to permit storage of said second panel within said collapsed transportation boxlike envelope when the trailer is brought to said transportation condition.

14. The subject matter of claim 13 in which there are hinge means for a major portion of said one of said walls which hinges down and forms the entire second panel, and a lower bunk double bed mattress supported partly on said second panel and partly on a portion of said vehicle inside the boxlike walls at about floor level which is clear of structure interfering with said mattress.

15. The subject matter of claim 14 in which said one of said walls is the rear trailer wall and said rear wall in collapsed trailer condition is inclined forwardly as it extends upwardly at great enough angle relative to the vertical so that when said rear wall is hinged down in camping trailer condition the rear edge of said second panel extends rearwardly about as far as the rear edge of said first panel.

16. The subject matter of claim 13 in which said second panel is usable as a table external of said trailer or other horizontal supporting surface independently of whether or not said first panel has been moved to said second outer position and said means suspending said second panel includes support means operable to support said second panel when said first panel is still in said first inner position.

17. The subject matter of claim 16 in which there are hinge means for a major portion of said one of said walls which hinges down and forms at least part of said second panel and said support means is legs between said second panel and the ground.

18. The improvement in a camping trailer to be towed behind a vehicle and having a trailer-type chassis supporting a floor and boxlike upright side and end walls, said trailer having structure expandable and collapsible between collapsed transportation boxlike envelope condition and expanded camping shelterlike envelope condition, comprising:

19. The subject matter of claim 18 in which said panel is double bed width.
  a. hinge means and one of said walls having a major portion thereof forming the most of its height from near its top to near the level of said floor covered with a first flat planar sheetlike panel having its lower portion hingedly connected to said trailer by said hinge means and said panel hinging down from an upright position in transportation condition of said trailer to a horizontal position in which said flat planar sheetlike panel lies in a substantially horizontal plane and is cantilevered outwardly from said vehicle for use as a bed;
  b. support means connected to said panel and operative to support said panel in said horizontal position;
  c. said sheetlike panel having bed width so that it may be used for that purpose.

20. The subject matter of claim 18 in which there is an upper double bed panel and support means supporting said upper panel in position in trailer camping condition cantilevered out from said one of said walls above said first panel a sufficient distance so that said first panel may act as a lower bunk below the upper panel which acts as an upper bunk.

* * * * *

UNITED STATES PATENT OFFICE
CERTIFICATE OF CORRECTION

Patent No. 3,623,765        Dated November 30, 1971

Inventor(s) Duane C. Bowen

It is certified that error appears in the above-identified patent and that said Letters Patent are hereby corrected as shown below:

Column 8, cancel lines 40 and 41 and insert after line 55, same column.

Signed and sealed this 17th day of October 1972.

(SEAL)
Attest:

EDWARD M. FLETCHER, JR.          ROBERT GOTTSCHALK
Attesting Officer                Commissioner of Patents